(12) United States Patent
Sievers-Paulsen et al.

(10) Patent No.: US 10,696,342 B2
(45) Date of Patent: Jun. 30, 2020

(54) LUGGAGE HOLDER WITH INTEGRATED POCKET

(71) Applicant: Bayerische Motoren Werke Aktiengesellschaft, Munich (DE)

(72) Inventors: Johann Sievers-Paulsen, Freising (DE); Peter Reinhart, Peissenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/138,171

(22) Filed: Sep. 21, 2018

(65) Prior Publication Data
US 2019/0023340 A1    Jan. 24, 2019

Related U.S. Application Data

(63) Continuation of application No. PCT/EP2017/051352, filed on Jan. 24, 2017.

(30) Foreign Application Priority Data

Mar. 23, 2016   (DE) .................. 10 2016 204 793

(51) Int. Cl.
*B62J 9/00* (2020.01)
*A45C 13/02* (2006.01)
*A45C 7/00* (2006.01)

(52) U.S. Cl.
CPC .............. *B62J 9/00* (2013.01); *A45C 7/0045* (2013.01); *A45C 13/02* (2013.01); *A45C 2013/026* (2013.01)

(58) Field of Classification Search
CPC ..... B62J 9/00; B62J 9/001; B62J 9/003; B62J 9/005; B62J 9/006; B62J 9/008;
(Continued)

(56) References Cited

U.S. PATENT DOCUMENTS 4,921,151 A * 5/1990 Duvall .................. A45C 11/20
                                                            190/125
7,086,437 B1    8/2006 Michael
(Continued)

FOREIGN PATENT DOCUMENTS

CA    2 635 328 A1    12/2009
CN    2778651 Y       5/2006
(Continued)

OTHER PUBLICATIONS

International Search Report (PCT/ISA/210) issued in PCT Application No. PCT/EP2017/051352 dated Apr. 24, 2017 with English translation (five (5) pages).
(Continued)

*Primary Examiner* — Corey N Skurdal
(74) *Attorney, Agent, or Firm* — Crowell & Moring LLP

(57) ABSTRACT

A luggage holder with an integrated pocket has an inner wall which delimits a luggage space. The pocket is detachably connected to the inner wall of the luggage holder by a connection arrangement. The connection arrangement has at least one connecting section that is designed to engage detachably with a corresponding recess that receives the respective connecting section.

13 Claims, 3 Drawing Sheets

(58) Field of Classification Search
CPC .......... B62J 9/02; A47C 7/0045; A47C 13/02; A47C 2013/026
See application file for complete search history.

(56) References Cited

U.S. PATENT DOCUMENTS

| | | | | |
|---|---|---|---|---|
| 2007/0095872 | A1* | 5/2007 | White | B62J 9/00 |
| | | | | 224/420 |
| 2007/0102469 | A1 | 5/2007 | Roth | |
| 2010/0176169 | A1 | 7/2010 | Lovett | |
| 2015/0274232 | A1* | 10/2015 | Hamada | B62J 9/008 |
| | | | | 180/219 |
| 2018/0168307 | A1* | 6/2018 | Mieck | A45F 5/02 |
| 2018/0206605 | A1* | 7/2018 | Wu | A45C 7/0045 |
| 2019/0047651 | A1* | 2/2019 | Hirn | B62J 17/02 |

FOREIGN PATENT DOCUMENTS

| | | |
|---|---|---|
| CN | 2835047 Y | 11/2006 |
| CN | 1950248 A | 4/2007 |
| CN | 200960965 Y | 10/2007 |
| CN | 201046734 Y | 4/2008 |
| CN | 201135771 Y | 10/2008 |
| CN | 102627130 A | 8/2012 |
| CN | 203612125 U | 5/2014 |
| CN | 104648549 A | 5/2015 |
| CN | 104648550 A | 5/2015 |
| DE | 103 23 443 A1 | 12/2004 |
| DE | 20 2007 001 804 U1 | 4/2007 |
| EP | 0 517 265 A2 | 12/1992 |
| GB | 2 482 126 A | 1/2012 |
| GB | 2 496 759 A | 5/2013 |
| JP | 8-168408 A | 7/1996 |
| TW | M374427 U1 | 2/2010 |

OTHER PUBLICATIONS

German-language Written Opinion (PCT/ISA/237) issued in PCT Application No. PCT/EP2017/051352 dated Apr. 24, 2017 (five (5) pages).
German-language Search Report issued in counterpart German Application No. 10 2016 204 793.0 dated Oct. 11, 2016 with partial English translation (12 pages).
German-language Office Action issued in counterpart German Application No. 10 2016 204 793.0 dated Nov. 8, 2016 (five (5) pages).
German-language Decision of Grant issued in counterpart German Application No. 10 2016 204 793.0 dated Dec. 1, 2016 (nine (9) pages).
Chinese-language Office Action issued in counterpart Chinese Application No. 201780004796.X dated Jun. 17, 2019 with English translation (18 pages).
Chinese-language Office Action issued in Chinese Application No. 201780004796.X dated Mar. 24, 2020 with English translation (18 pages).

* cited by examiner (Detail A)

LUGGAGE HOLDER WITH INTEGRATED POCKET

CROSS REFERENCE TO RELATED APPLICATIONS

This application is a continuation of PCT International Application No. PCT/EP2017/051352, filed Jan. 24, 2017, which claims priority under 35 U.S.C. § 119 from German Patent Application No. 10 2016 204 793.0, filed Mar. 23, 2016, the entire disclosures of which are herein expressly incorporated by reference.

BACKGROUND AND SUMMARY OF THE INVENTION

The invention relates to a luggage holder with an integrated pocket.

In the interior of a case, small objects are relatively difficult to stow and to secure when the case is otherwise empty or only partially filled. As a result, when the case moves, the objects are able to move within the interior and become damaged.

This occurs particularly frequently with highly dynamic movements of the case such as, for example, in luggage holders for motorcycles or vehicles similar to motorcycles.

It is, therefore, the object of the invention to provide a luggage holder in which smaller objects may be securely stowed, in particular a suitable luggage holder for motorcycles and the like.

This object is achieved by a luggage holder with an integrated pocket, wherein the luggage holder has an inner wall which delimits a luggage space and the pocket is detachably connected to the inner wall of the luggage holder by way of a connection arrangement. The connection arrangement comprises at least one connecting section which is designed to engage detachably in one respective recess which receives said connecting section.

The pocket is, therefore, fastened inside the luggage holder to the inner wall. This means that the pocket is dimensioned to be of the same size or smaller than the luggage space. In other words, the pocket has a total volume which is the same as, or preferably smaller than, a volume of the luggage space delimited by the inner wall. The connection arrangement is designed to be detachable so that the pocket fastened thereby to the inner wall may be detached if required and may be removed from the luggage holder in a simple manner. In this case, the entire internal volume of the luggage space is available for other objects.

The connection arrangement is designed in at least two parts, wherein one or more connecting sections for producing the connection engage in each case in a correspondingly provided recess. For detaching the connection and removing the pocket, the at least one connecting section is removed from the engagement with the associated recess.

Preferably, the at least one connecting section is configured to be hook-shaped or tab-shaped. This permits a simple and user-friendly insertion of the one or more connecting sections into the corresponding recesses in a common insertion direction. To this end, the connecting sections are arranged in parallel and aligned with one another. Preferably, the insertion direction is oriented from an opening of the luggage holder in the direction of a base or a rear wall of the luggage holder and/or the inner wall thereof.

For example, the at least one connecting section may be assigned to the pocket and the receiving recess may be assigned to the inner wall. Alternatively, the at least one connecting section may be assigned to the inner wall and the receiving recess may be assigned to the pocket.

According to a further embodiment, the luggage holder may comprise a centering device in order to center the pocket in a defined set position. This permits the accurate arrangement and fastening of the pocket in the desired installed position, which is also denoted hereinafter as the set position.

The centering device may comprise, for example, a centering recess and a centering projection engaging in the centering recess. Preferably, the centering device is configured such that when inserting the pocket, i.e. for example when inserting the connecting sections into the recesses, at the same time the centering projection is also introduced and aligned in the centering recess, in order to ensure in this manner the correct alignment and positioning. According to one embodiment, the centering projection is configured as a rib which engages in a counter-bearing, the centering recess.

For example, the centering projection may be arranged on a rear wall and/or on a base of the inner wall and the centering recess may be assigned to the pocket, in particular a rear wall of the pocket.

Moreover, the pocket may be connectable to the inner wall by means of at least one detachable blocking device in order to be blocked in the defined set position, in particular to a rear wall and/or a base of the luggage holder.

The blocking device is provided to block the pocket in the set position and to secure the pocket against inadvertent detachment.

For example, the at least one detachable blocking device in each case comprises a detachable latching mechanism, in particular a detachable latching mechanism with at least one push button and/or at least one latching lug. The latching mechanism may be automatically latched when the pocket is inserted or manually latched by the user. Correspondingly, the latching mechanism has to be detached before removing the pocket.

Naturally, the detachable blocking device may alternatively comprise a screw connection. However, this may only be detached by the user by using an additional tool and with greater effort.

According to a preferred embodiment, a first blocking device is arranged in the region of the connection arrangement and a second blocking device is arranged in the region of the centering device.

In particular a case, preferably a case for a motorcycle or a vehicle similar to a motorcycle, in particular a top case or a side case, is to be understood as a "luggage holder". In such vehicles, particularly high dynamic movements are common, said movements leading to corresponding inertial forces on the luggage and requiring a corresponding securing of the luggage.

In particular all single-track vehicles but also multi-track vehicles are to be understood as a "vehicle similar to a motorcycle", in each case with a corresponding saddle-shaped seat bench for the user, particularly preferably two-wheeled, three-wheeled or four-wheeled motor scooters and scooters, but also quads or trikes.

For example "soft" containers made of a textile fabric but also containers with a hard outer shell are to be understood as the "pocket". As disclosed, the size of the pocket is adapted for insertion into the interior of the luggage holder and correspondingly designed to be of the same size to or smaller than the luggage space.

For example, the pocket may be designed for the secure stowage of small objects (in comparison with the size of the luggage space), such as for example travel accessories or electronic entertainment devices, mobile telephones or the like.

For closing the pocket, a zip closure may also be provided.

Moreover, the luggage holder may provide an electronic contact, for example a power, data and/or audio connection to the vehicle. Electronic devices located in the pocket may, therefore, be easily connected via corresponding cables transmitting power and/or data.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
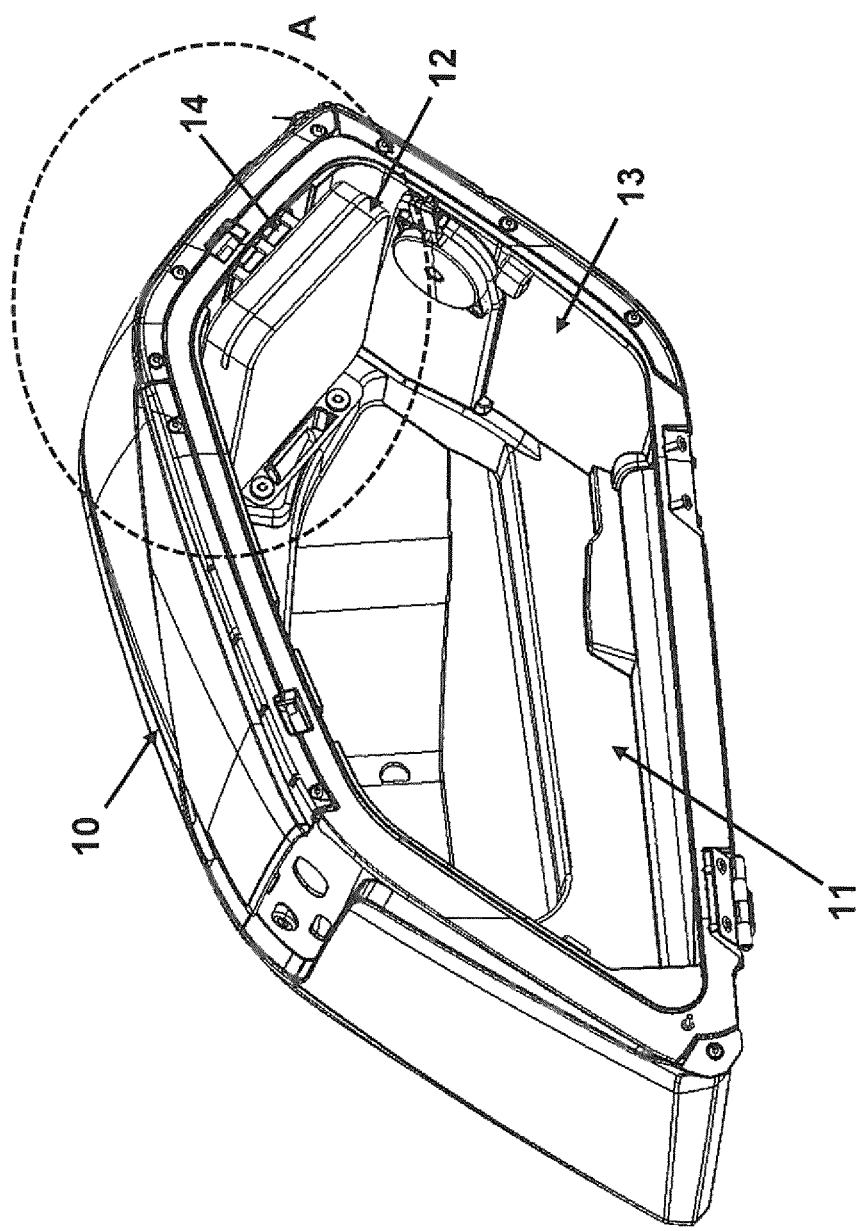
FIG. 1 is a perspective view of a side case for a motorcycle according to an embodiment of the invention.

A luggage holder 10 which is configured as a side case for a motorcycle is shown in a perspective view in FIG. 1. For reasons of improved clarity, a cover for closing a luggage space 11 enclosed by the luggage holder 10 is not illustrated.

The luggage holder 10 has an integrated pocket 12, wherein the luggage holder 10 comprises an inner wall 13 delimiting the luggage space 11 and the pocket 12 is detachably connected to the inner wall 13 of the luggage holder 10 via a connection arrangement 14.

Figure 2:
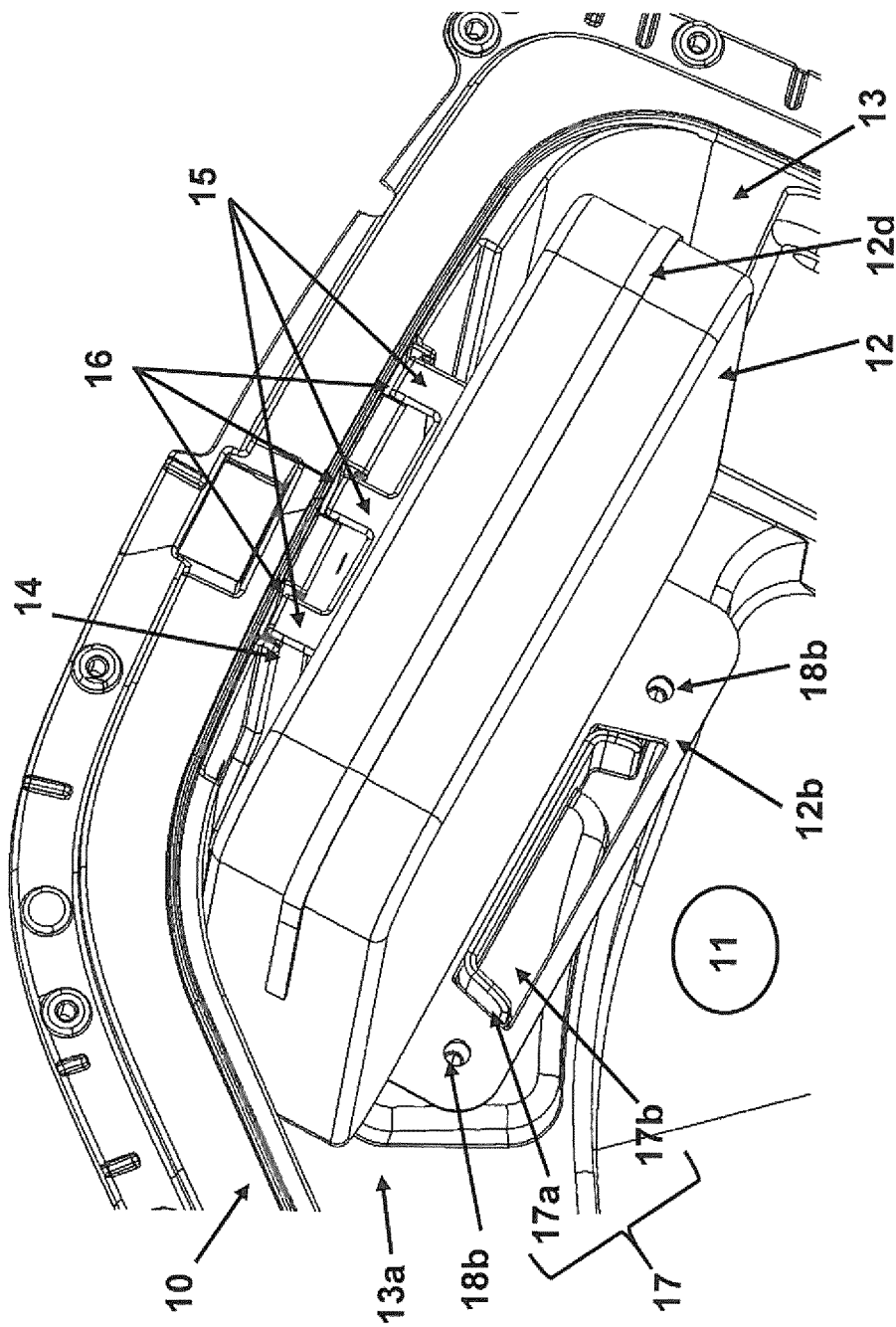
FIG. 2 is a detailed view A of FIG. 1.
Figure 3:
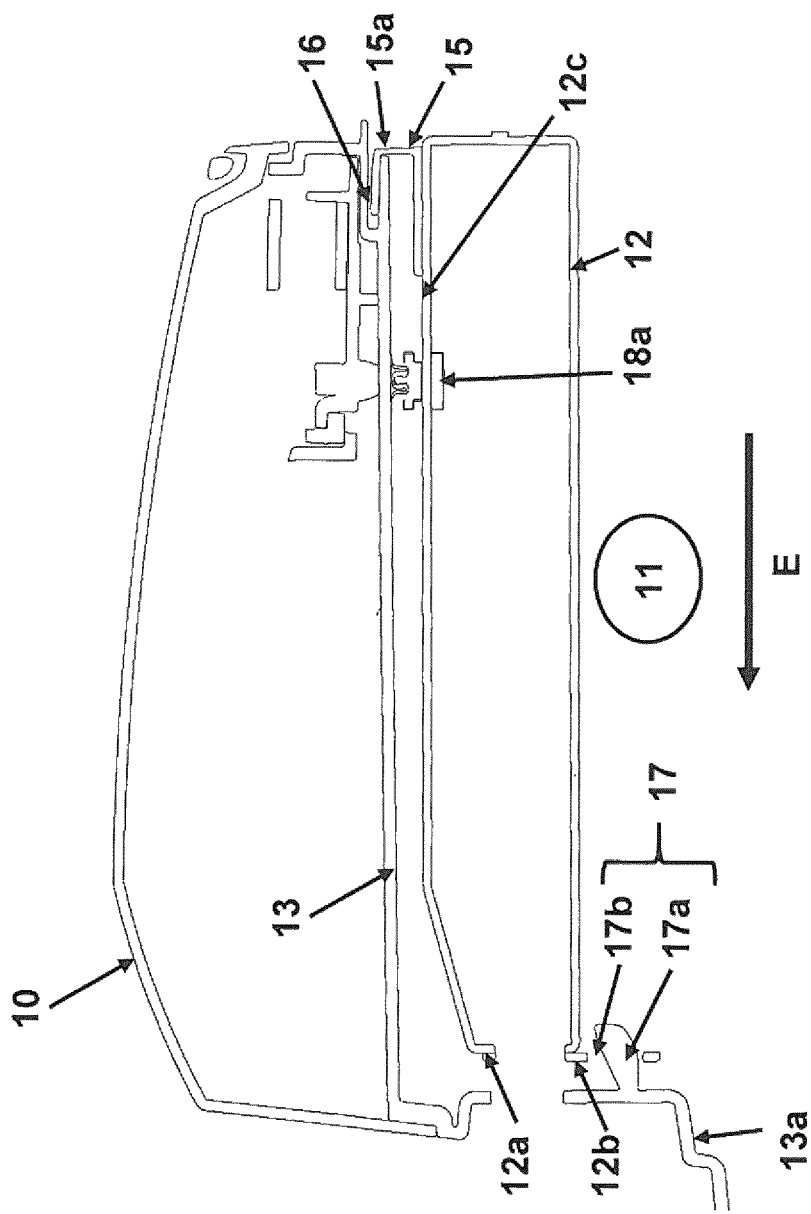
FIG. 3 is a sectional view of FIG. 2.

FIG. 2 and FIG. 3 show a detailed view A and/or a sectional view of the luggage holder 10 of FIG. 1 with the integrated pocket 12, wherein the connection arrangement 14 is arranged on an upper face 12c of the pocket 12 and includes three connecting sections 15, which in each case engages detachably in a recess 16 receiving the respective connecting section 15 and thus connects the pocket 12 to the inner wall 13. In the embodiment shown, the three connecting sections 15 are assigned to the pocket 12 and the receiving recesses 16 are assigned to the inner wall 13. It goes without saying that alternatively the connecting sections may be assigned to the inner wall and the receiving recesses may be assigned to the pocket.

Each of the three connecting sections 15 is of hook-shaped configuration as may be identified from FIG. 3, wherein the hook shape is formed by a U-shape and in each case an outer limb 15a of the individual connecting section 15 engages in the recess 16 when inserting the pocket 12 in an insertion direction E.

Additionally, the luggage holder 10 has a centering device 17 in order to center the pocket 12 in a defined set position, the installed position shown in FIGS. 1 to 3. The centering device 17 has a centering recess 17b and a centering projection 17a engaging in the centering recess 17b. The centering device 17 permits an accurate positioning of the pocket 12 in the luggage space 11 of the luggage holder 10 and prevents a lateral relative movement of the pocket 12 with regard to the inner wall 13.

To this end, the centering projection 17a is arranged on a rear wall 13a of the inner wall 13. Depending on the alignment and design of the luggage holder 10 the rear wall may also be a "base" (not shown) of the luggage holder 10.

Moreover, the centering recess 17b is assigned to the pocket 12. To this end, the pocket has on a rear wall 12a of the pocket 12 a projection 12b, in which the centering recess 17b is provided. In the embodiment shown, the projection 12b is only attached, for example, as a plate to the rear face 12a of the pocket 12.

Moreover, the pocket 12 includes two detachable blocking devices 18a, 18b, the pocket 12 being detachably connectable thereby to the inner wall 13 in the defined set position. A first detachable blocking device 18a is arranged on the upper face 12c of the pocket 12 in the region of the connection arrangement 14. A second detachable blocking device is provided in the region of the centering device 17 for connecting the pocket 12 to the rear wall 13a of the luggage holder 10.

Each of the two detachable blocking devices 18a, 18b has one respective detachable latching mechanism. This is formed for the first blocking device 18a from an individual push button and for the second blocking device 18b from two push buttons which are arranged on both sides of the centering recess 17b. Alternatively, instead of the push buttons it is also possible to use suitable latching lugs.

The pocket 12 may be produced, for example, as a "soft" container made of a textile fabric but also as a container with a hard outer shell. It is possible to close the pocket 12 by means of a zip closure 12d.

Instead of the side case shown, the luggage holder 10 may also be designed, for example, as a top case.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A luggage holder, comprising:
an inner wall which delimits a luggage space of the luggage holder;
a connection arrangement, and
a pocket detachably connected in an integrated manner to the inner wall of the luggage holder via the connection arrangement,
wherein
the connection arrangement comprises at least one connecting section which is configured to engage detachably in one respective recess which receives said connecting section, and to release the pocket from the luggage holder when the at least one connecting section is disengaged, and
the at least one connecting section attaches the pocket to the luggage holder during an insertion movement of the pocket into the luggage holder.
2. The luggage holder as claimed in claim 1, wherein the at least one connecting section is configured to be hook-shaped or tab-shaped.
3. The luggage holder as claimed in claim 2, wherein the at least one connecting section is assigned to the pocket and the receiving recess is assigned to the inner wall, or
the at least one connecting section is assigned to the inner wall and the receiving recess is assigned to the pocket.
4. The luggage holder as claimed in claim 1, wherein the luggage holder comprises a centering device in order to center the pocket in a defined set position.

5. The luggage holder as claimed in claim 4, wherein the centering device comprises a centering recess and a centering projection engaging in the centering recess.

6. The luggage holder as claimed in claim 5, wherein the centering projection is arranged on a rear wall of the inner wall and/or is arranged on a base of the inner wall, and the centering recess is assigned to a rear wall of the pocket.

7. The luggage holder as claimed in claim 4, wherein the pocket is connectable to the inner wall by at least one detachable blocking device in order to be blocked in the defined set position.

8. The luggage holder as claimed in claim 7, wherein the defined set position is on a rear wall and/or a base of the inner wall.

9. The luggage holder as claimed in claim 7, wherein the at least one detachable blocking device in each case comprises a detachable latching mechanism with at least one push button and/or at least one latching lug.

10. The luggage holder as claimed in claim 7, wherein a first blocking device is arranged in the region of the connection arrangement and a second blocking device is arranged in the region of the centering device.

11. The luggage holder as claimed in claim 1, wherein the luggage holder is a case for a motorcycle or a vehicle similar to a motorcycle.

12. The luggage holder as claimed in claim 11, wherein the case is a top case or a side case.

13. The luggage holder as claimed in claim 1, wherein the pocket comprises a textile fabric.

* * * * *